(12) United States Patent
Kissell et al.

(10) Patent No.: US 10,778,691 B1
(45) Date of Patent: Sep. 15, 2020

(54) DYNAMIC SECURITY POLICY CONSOLIDATION

(71) Applicant: Amazon Technologies, Inc., Reno, NV (US)

(72) Inventors: Robert W. Kissell, Bealeton, VA (US); Eric Andrew Scholz, Ashburn, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 285 days.

(21) Appl. No.: 15/835,172

(22) Filed: Dec. 7, 2017

(51) Int. Cl.
*G06F 21/62* (2013.01)
*H04L 29/06* (2006.01)
*G06F 16/335* (2019.01)
*G06F 21/60* (2013.01)

(52) U.S. Cl.
CPC .......... *H04L 63/104* (2013.01); *G06F 16/337* (2019.01); *G06F 21/604* (2013.01); *G06F 21/6218* (2013.01); *H04L 63/102* (2013.01); *H04L 63/20* (2013.01)

(58) Field of Classification Search
CPC ..... H04L 63/104; H04L 63/102; H04L 63/20; G06F 16/337; G06F 21/6218
See application file for complete search history.

(56) References Cited

U.S. PATENT DOCUMENTS

| | | | | |
|---|---|---|---|---|
| 7,284,271 B2* | 10/2007 | Lucovsky | ........... | G06F 21/6218 726/18 |
| 7,730,523 B1* | 6/2010 | Masurkar | .............. | H04L 63/168 726/4 |
| 8,893,269 B1* | 11/2014 | Jayaram | ................ | G06F 21/604 707/610 |
| 2007/0116228 A1* | 5/2007 | Schneider | ............. | H04M 15/06 379/211.01 |
| 2007/0124820 A1* | 5/2007 | Burch | ..................... | G06F 21/31 726/26 |
| 2010/0306268 A1* | 12/2010 | Bhatti | ................... | G06F 21/604 707/783 |
| 2015/0033297 A1* | 1/2015 | Sanso | ................... | H04L 63/104 726/5 |
| 2016/0379001 A1* | 12/2016 | Eska | ..................... | H04L 63/102 726/4 |

* cited by examiner

*Primary Examiner* — Farid Homayounmehr
*Assistant Examiner* — Zhimei Zhu
(74) *Attorney, Agent, or Firm* — Hogan Lovells US LLP

(57) ABSTRACT

Various embodiments provide for the consolidation of policies across multiple identities that are respectively associated with multiple active directory (AD) groups to which a user belongs. Present embodiments provide for dynamically generating a new identity in the resource provider environment that includes permissions to all of the resources that may otherwise be distributed across multiple identities. Specifically, in accordance with various embodiments, when a user login is detected, the active directory is queried to determine the AD groups to which the user belongs. As mentioned, the user's AD groups are mapped to respective identities in the resource provider environment, in which each identity includes policy defining access to one or more resources. The policies of all the respective identities are consolidated and assigned to a new identity. The user may assume the new identity and access all the resources in tandem.

20 Claims, 9 Drawing Sheets

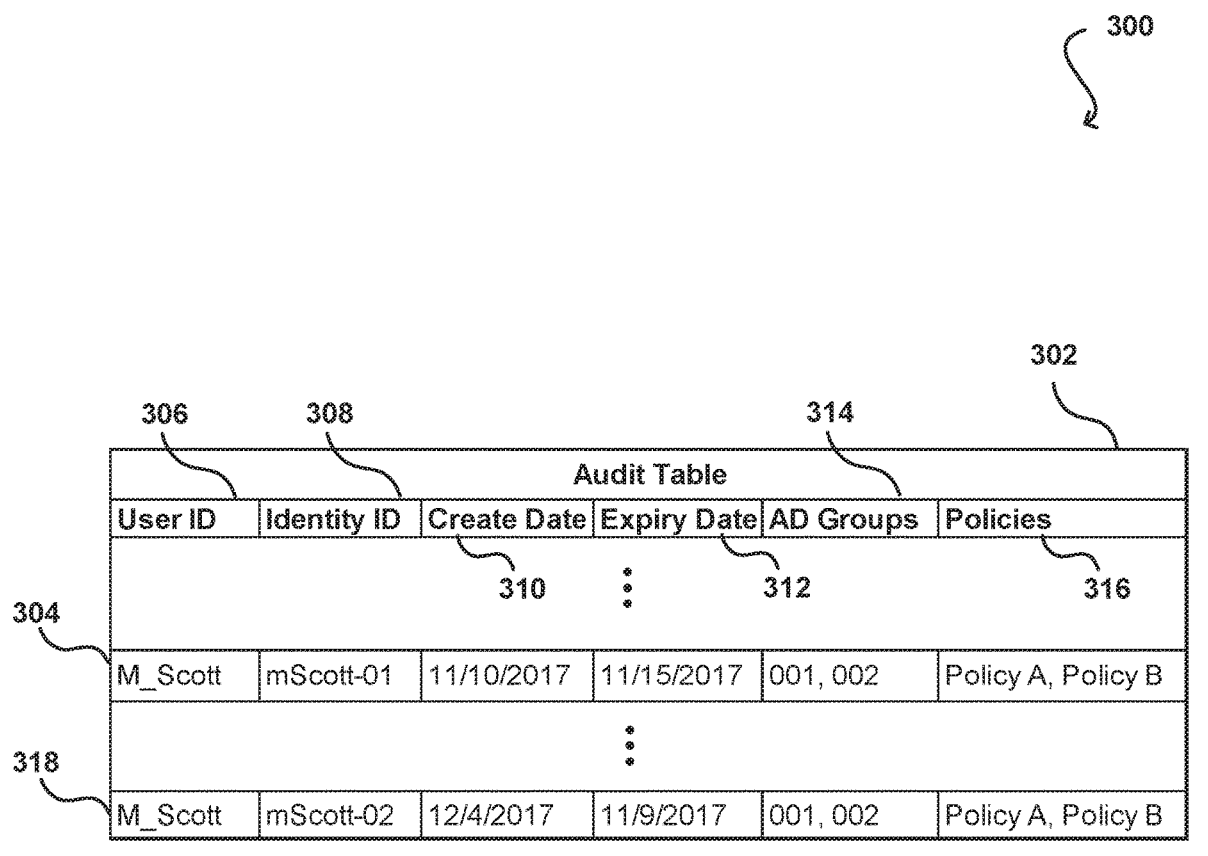

| Audit Table |||||| 
| User ID | Identity ID | Create Date | Expiry Date | AD Groups | Policies |
| --- | --- | --- | --- | --- | --- |
| M_Scott | mScott-01 | 11/10/2017 | 11/15/2017 | 001, 002 | Policy A, Policy B |
| ⋮ |||||| 
| M_Scott | mScott-02 | 12/4/2017 | 11/9/2017 | 001, 002 | Policy A, Policy B |

FIG. 3

DYNAMIC SECURITY POLICY CONSOLIDATION

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Users can perform tasks such as storing data to various types of resources offered by a resource provider, accessing the data, and performing various functions utilizing the data and/or services provided by the resource provider. An "identity" in the resource provider environment may define certain policies that govern access to such resources, such as what data and/or services a user assuming the identity may or more not access. Typically, such network accessibility is primarily protected using credentials such as username and password associated with the resource provider environment. Federated identities, such as client-side active directory (AD) credentials, may also be used to access the above-described resources. However, due to mapping constraints, difficulties may arise in which a user logged in through a federated identity may not be able to access all the resources needed to complete a task in the resource provider environment.

BRIEF DESCRIPTION OF THE DRAWINGS

Various embodiments in accordance with the present disclosure will be described with reference to the drawings, in which:

FIG. 3 illustrates an audit table for managing dynamically created identities, in accordance with various embodiments of the present disclosure.

DETAILED DESCRIPTION

Figure 1:
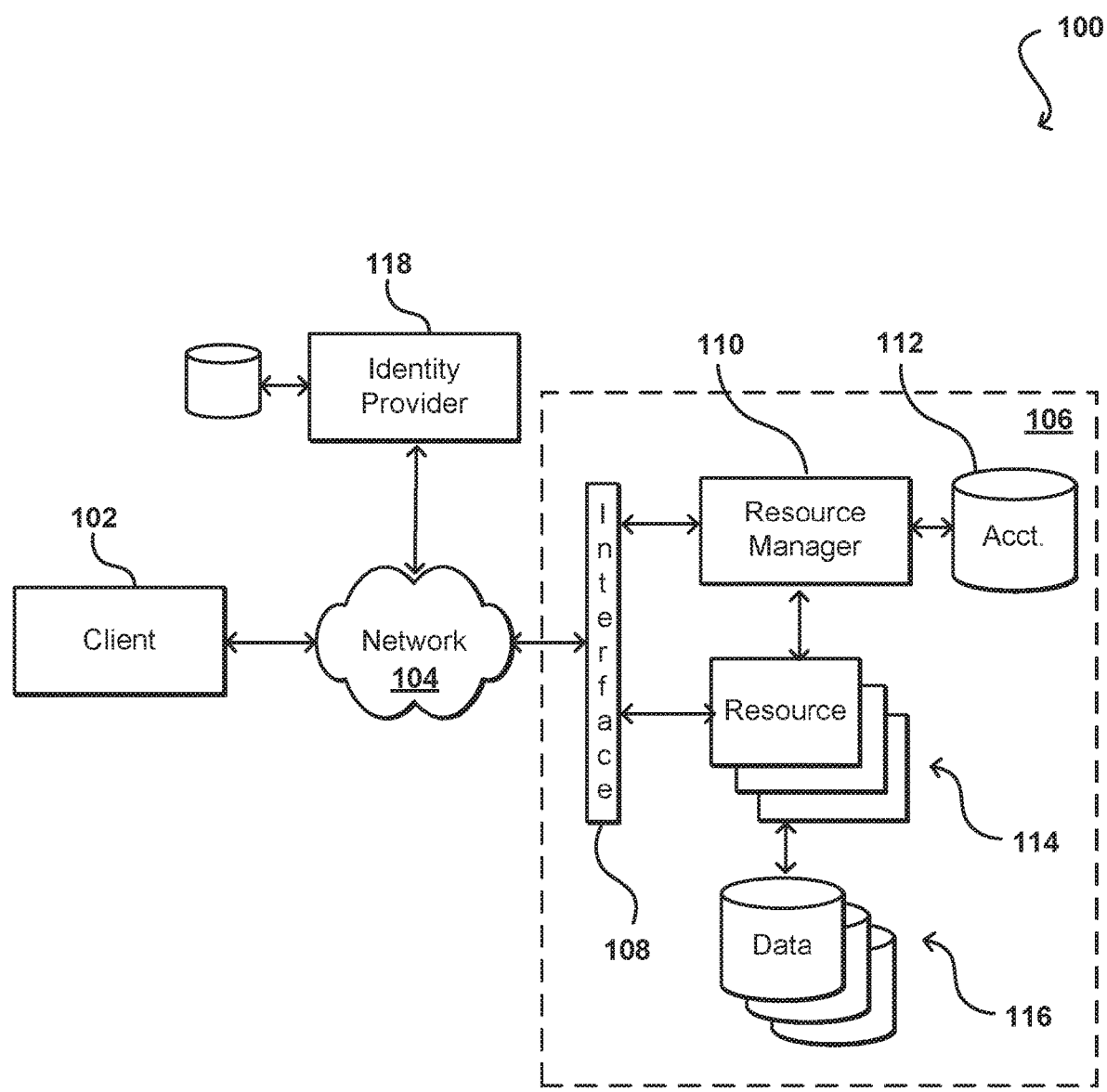
FIG. 1 illustrates an example environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for management of data and resource access in an electronic environment. In particular, various embodiments provide for the consolidation of separate policies that are associated with a federated identity. For example, various embodiments provide for the consolidation of policies across multiple roles that are respectively associated with multiple AD groups to which a user belongs.

In various embodiments, a customer (or other entity) may utilize an active directory to organize user credentials and permissions for certain applications. The users in an active directory may be organized into one or more active directory (AD) groups. The active directory may be integrated with a resource provider environment such that active directory user credentials can be used to log into the resource provider environment. As a part of the integration, AD groups are mapped to identities in the resource provider environment on a one-to-one basis, such that a user in a certain AD group assumes the respective identity in the resource provider environment. The AD group to identity mapping thereby defines the user's access to resources in the resource provider environment. However, a user may belong to multiple AD groups, but is only able to assume one identity at a time, and thus may only access the resources permitted by that identity during a session. Present embodiments provide for dynamically generating a new identity in the resource provider environment that includes permissions to all of the resources that may otherwise be distributed across multiple identities. Specifically, in accordance with various embodiments, when a user login is detected, the active directory is queried to determine the AD groups to which the user belongs. As mentioned, the user's AD groups are mapped to respective identities in the resource provider environment, in which each identity includes policy defining access to one or more resources. The policies of all the respective identities are consolidated and assigned to a new identity. The user may assume the new identity and access all the resources in tandem.

Various other features and application can be implemented based on, and thus practice, the above described technology and presently disclosed techniques. Accordingly, approaches in accordance with various embodiments improve the performance of computing systems by providing techniques that enable disparate network security systems to integrate seamlessly, allowing information to flow while still enforcing security protocols. Network security is a challenge that is specific to and arises only within the realm of computing technology, and becomes increasingly more challenging as computing systems become more connected and sophisticated. A more secure computing system is a better computing system. Thus, network security solutions, which aims to improve the security of computing systems, necessarily improve the technology of computing systems. It is also a goal of computing technology to improve the ease and speed of information flow. Thus, innovations that improve the ease and speed of information flow are also necessarily improvements in computing technology. The present embodiments provide a distinct network security solution while also increasing the ease of information flow, both of which provide improvements to underlying computing technology. Various other applications, processes, and uses are presented below with respect to the various embodiments, each of which improves the operation and performance of the computing device(s) on which they are implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 118, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, access to resources (e.g., data and services) provided by the resource provider environment 106 may be protected using credentials such as username and password associated with the resource provider environment 106. A user can provide any of various types of credentials in order to authenticate an identity of the user to the provider. The credentials may be generated and/or maintained by the resource provider environment 106 and specifically used for accessing resources within the resource provider environment 106. Alternatively, the credentials may be generated and/or maintained by an entity outside of the resource provider environment and used to access applications outside of the resource provider environment 106 as well as resources within the resource provider environment, such as in the case of various embodiments of the present disclosure. Such credentials are associated with a "federated identity", which are credentials that enable access across multiple applications with distinct identity management systems through a single sign-on (SSO). These credentials can be provided by, or obtained from, a number of different entities that are separate from the resource provider environment. Such entities may include an identity provider, a key management service, a corporate entity, a certificate authority, an identify broker such as a SAML provider, and the like. For example, an identity provider can provide the credentials to the resource provider environment 106 and/or to the client device 102, whereby the client device 102 can utilize those credentials to obtain access or use of various resources in the resource provider environment 106, where the type and/or scope of access can depend upon factors such as a type of user, a type of user account, a role associated with the credentials, or a policy associated with the user and/or credentials, among other such factors. Specifically, in some embodiments, an identity defined in the resource provider environment may define certain policies that govern access to such resources, such as what data and/or services a user assuming the role may or more not access. An "identity" as use herein may refer to any means of defining a set of policies or setting that can be assumed by a user, and which may otherwise be referred to as a role, a group of roles, users, among various other interchangeable names.

In various, a plurality of users may be associated with a specific customer, such as a company or entity. For example, a company may have a plurality of employees and each employee is a different user with distinct credentials that may be used to access the resource provider environment 106 as well as other client applications or resources outside of the resource provider environment 106. The users associated with the entity may be organized using a user management database, such as what is commonly referred to as a directory service or active directory (AD). Active directory as used herein refers not specifically to "Active Directory", the directory service provided by Microsoft®, but rather to a broad range of user management services and techniques commonly referred to as "active directory" in the field of art. In various embodiments, an active directory may organize the users associated with the entity into a plurality of groups, or "AD groups", in which a group defines various access rights of users in the group. For example, an entity may have the "administrator" or "normal user" AD groups, in which users belonging to the administrator group have different access rights than users in the normal user group. In practice, an entity may have any number of AD groups, defined not only by access level, but any means of user grouping, such as by departments of a company, specific job roles, project teams, among others.

Typically, the active directory and AD groups are used to define access rights to resources, applications, and actions in a client-side environment. However, as the user credentials and identity of users used in the active directory are also used to access the resource provider environment 106 through federated identities, AD groups can also be used to define access to resources within the resource provider environment. Specifically, in various embodiments, AD groups are mapped to identities in the resource provider environment on a one-to-one basis, such that one AD group is mapped to one and only one identity in the resource provider environment. The different identities may have different policies that dictate which resources are accessible through each of the different identities, so users belonging to different AD groups may have access to difference resources within the resource provider environment 106. When a user logs in to the resource provider environment, the user assumes the identity that corresponds to the user's AD group, and is able to make requests that are in line with the policies and permissions defined by that identity. In some embodiments, the resource manager 110 maintains the mapping between AD groups and identities in the resource provider environment 106. The mapping and the identities may be created by a super-user or administrator associated with the entity (e.g., customer).

However, difficulties may arise when a user belongs to multiple AD groups. Specifically, a user belonging to multiple AD groups should be able to access resources accessible through of all of the respective identities that correspond to the AD groups. However, the user may only assume one identity at a time, and thus may only access the resources permitted by that identity. This may be due to the legacy design of the resource provider environment 106, network security measures, or other reasons governing, at least in part, the architecture of the resource provider environment 106. Thus, the user may not be able to access all of the resources needed to complete a task in the resource provider environment 106. For example, the user may need to use dataset A and dataset B together to complete a task, but dataset A is only accessible through identity A and dataset B is only accessible through identity B. Although the user belongs to be both AD groups that correspond to identity A and B, the user may only access dataset A or dataset B at a time, but not both. As a manual workaround to this challenge, the user may log in to identity A, obtain dataset A, and save dataset A in an external location. The user may then need to log out of identity A, log in to identity B, and obtain dataset B. In this scenario, the external saving of dataset A may not be the most secure way to handle that data and the extra actions of saving dataset A and logging in and out may be a nuisance and decrease productivity.

Present embodiments provide for dynamically generating a new identity in the resource provider environment 106 that includes permissions to all of the resources that may otherwise be distributed across multiple identities. Specifically, in accordance with various embodiments, when a user logs in to the resource provider environment 106 using a user identifier (ID), such as their federated user ID, the user ID is checked against a client directory, such as the active directory, to determine which, if any, AD groups the user ID belongs to. It can then be determined, based on the user's AD groups, the corresponding identities in a host database (e.g., the resource provider environment) that the user ID is associated with. The corresponding identities may have respective policies that govern access rights of the identity, among other settings. Once all the identities that are associated with the user ID are determined, the respective policies of all of the identities are consolidated. In some embodiments, the policy of a identity may be made up of one or more data objects. The consolidation of the policies of the plurality of identities may include creating a policy that includes all the data objects that make up the policies of all the identities. Consolidation of the policies may also include generating a new policy (e.g., one or more data objects) based on the content of the policies of all the identities. In some embodiments, the policies of the plurality of identities may include redundant data, such as redundant permissions. In such cases, copies of redundant data may be deleted.

A new identity is dynamically generated in the resource provider environment and the consolidated policies of all of the identities are assigned to the new identity, such that the new identity has access to all of the resources that can be accessed by any of the identities associated with the user ID. The user ID then assumes the new identity and the user may access the resources. Specifically, calls and requests associated with the user ID may be able to access the resources. The dynamically generated new identity may be a provisional identity that has a certain valid duration, among other conditions of validity, as described further below.

Figure 2:
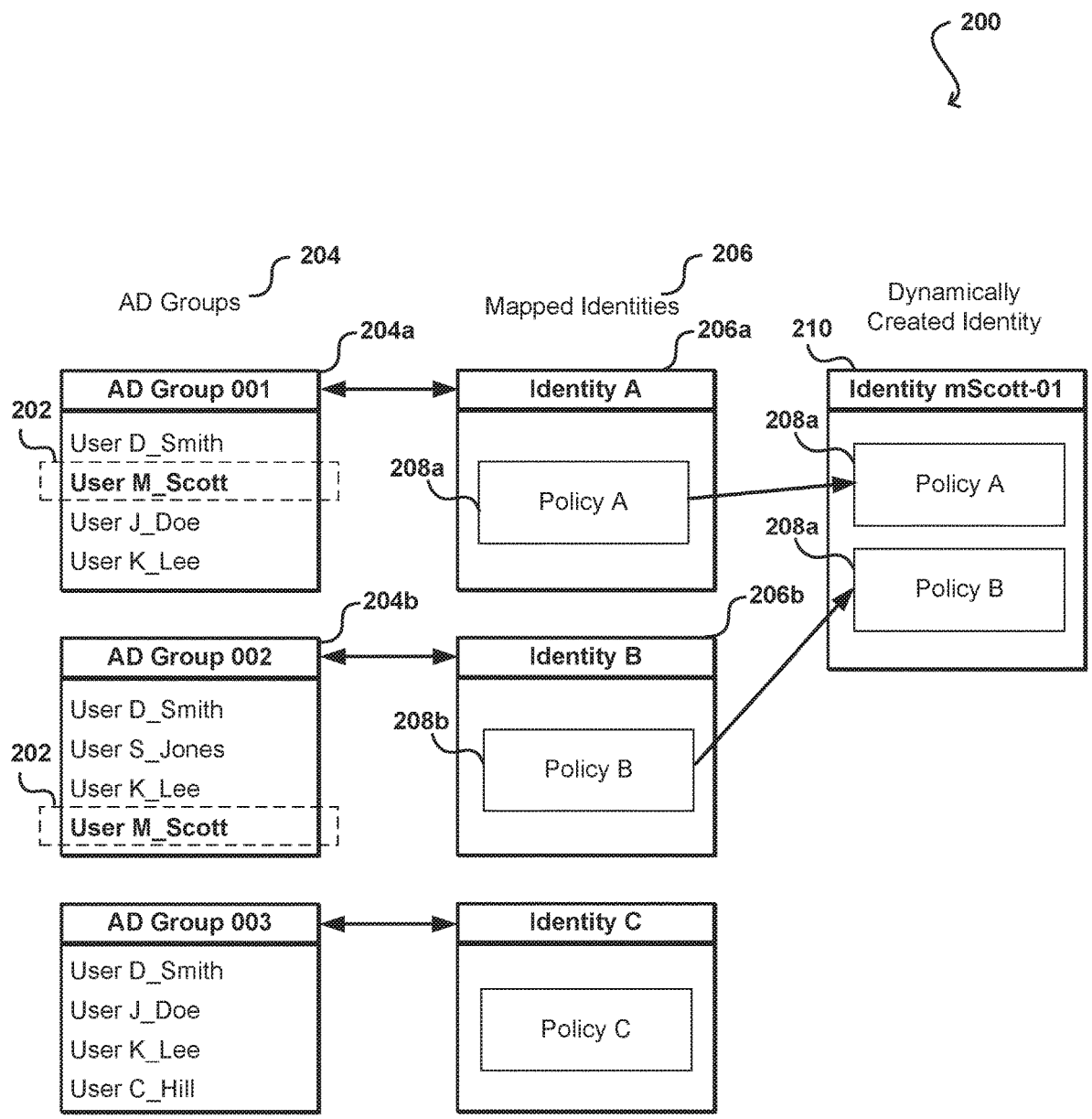
FIG. 2 illustrates consolidation of policies from multiple roles associated with a federated identity, in accordance with various embodiments of the present disclosure.

FIG. 2 illustrates consolidation of policies 200 from multiple identities associated with a federated identity, in accordance with various embodiments. In context of the aforementioned example regarding a user needing to access dataset A and dataset B in order to perform a task, and with reference to FIG. 2, present embodiments would be able to detect that the user ID of the logged the user (M_Scott) 202 belongs to two AD Groups 204, AD Group 001 (204a) and AD Group 002 (204b), which are respectively mapped to two identities 206 in the resource provider environment, Identity A (206a) and Identity B (206b). Identity A includes Policy A (208a) and Identity B includes Policy B (208b). As described above, for example, Policy A may permit access to dataset A, which is not permitted by Policy B, and Policy B may permit access to dataset B, which is not permitted by Policy A. As such, present embodiments, upon verifying that the user is associated with Identity A and Identity B, may obtain Policy A from Identity A and Policy B from Identity B, and dynamically generate a new identity 210 that includes both Policy A 208a and policy B 208b, or at least the permissions provided through Policy A and policy B. The user then assumes the new identity 210 and is able to access both dataset A and dataset B to complete the task, without needing to save either datasets externally or perform multiple logins. As used herein "Policy A" and "Policy B" are used representationally to represent any form or number of policies, or the like, that may be applied to roles in the resource provider environment 106.

In various embodiments, the dynamically generated Identity (mScott-01) 210 may be recorded as an entry in a database, such as an audit table as illustrated in the example 300 of FIG. 3, in accordance with various embodiments. When a new identity is generated for consolidating policies of a plurality of identities associated with AD groups, an entry is created in the audit table 302, such as entry 304 created for the above-described example. An entry includes a plurality of parameters, such as a user ID 306, an identity ID 308, a create date 310, an expiry date 312, AD groups 314, and the policies 316. The user ID 306 may refer to the user ID associated with the federated identity, which may be a part of a username used by the user as a login parameter or an identifier associated with the federated identity generated by the computing systems and used internally between the computing systems as a means of identifying the user. The user ID 306 may be the same user ID used to query the active directory to determine the AD groups to which the user belongs. The identity ID 308 may be an identifier assigned to the role when the role was generated. The create date 310 may be the date on which the role was generated. The expiry date 312 designates that date on which the role expires, meaning that the identity cannot be assumed past the expiry data. In some embodiments, instead of or in addition to the expiry date, any kind of expiry parameter may be used, such as a length of time from the create data during which the identity is valid. For example, instead of a date, the expiry parameter may be "2 hours" or "5 days", etc. The AD groups 314 refers to the AD groups in the active directory that the user ID 306 was found to belong to at the time the entry was generated. The policies 316 refers to the policies of the all the identities that were associated with the user ID at the time the entry was generated.

The audit table provides a means of maintaining a record of all dynamically generated identities as well as a present state of available identities. In various embodiments, and as mentioned, when a request to access the resource provider environment is received, the user ID associated with the request is used to query a client database, such as an active directory to determine which client-side groups, such as AD groups, the user ID belongs to. It can then be determined, using the audit table, whether a valid identity with consolidated policies already exists for that user ID. Thus, if a valid identity with consolidated policies already exists, the user ID can directly assume that identity without the need to generate a new identity. In various embodiments, there may be one or more conditions that must be met in order to determine that a valid identity is available for the particularly user ID. For example, in order to determine that a valid identity is available for the user ID, an entry having the user ID must be found in the audit table, meaning that such as an identity was previously generated for that user ID. If there are no entries for the user ID, then a valid identity does not exist for that user ID. Additionally, if an entry does exist for the user ID, the identity must not be expired at the time of this query, as defined by the expiry parameter (e.g., expiry date). If the expiry date has passed, then the identity is expired and is not a valid identity for the user ID. If there is an entry in the audit table for the user ID and the identity is not expired, then the AD groups listed in the entry are compared to the presently determined AD groups that the user ID belongs to. In some embodiments, a user's AD group may change, such as between the time an existing identity was generated and the time of the present query. For example, a user may have been moved to a different department or a given different access level, which may change the AD groups to which the user belongs. Thus, in order for an existing identity in the audit table 302 to be valid, the AD groups listed in the entry must match the current AD groups to which the user ID belongs, as determined in through a current query of the active directory. If these validity conditions are met, then it can be determined that a valid identity already exists for the user ID, and the user can assume that identity. In some embodiments, more, fewer, or different validity conditions may be used to determined validity of a previously generated identity with consolidated policies.

If, however, it is determined that a valid identity does not exist for the user ID, then a new identity may be dynamically generated for the user ID according to the techniques described above. For example, referring to FIG. 3, the audit table 302 includes an entry 306 of an existing identity for user ID "M_Scott", which shows that the identity was generated on Nov. 10, 2017 and expires on Nov. 15, 2017. A request associated with the user ID "M_Scott" may be received on Dec. 4, 2017. Upon receiving the request, the audit table 302 is queried to determine if a valid identity exists for this user. Although entry 304 is associated with the user ID, based on the expiry date 312, the identity in entry 304 has expired at the time of the query, and the identity in the entry (Identity ID "mScott-01") is no longer valid. Thus, it can be determined that a valid identity with consolidated policies does not exist for the user ID "M_Scott". In this case, a new identity may be dynamically generated, which includes the consolidated polices of all the identities that are associated with the user ID based on the user's AD groups. Thus, a new entry 318 will also be created in the audit table 302 as a record of the new identity. For example, the identity ID 308 for this identity may be "mScott-02" to distinguish from the previously generated and presently invalid identity "mScott-01". In some embodiments, when it determined that an identity is no longer valid, the identity may be deleted from the resource provider environment, but the record of the identity may be maintained in the audit table.

Figure 4:
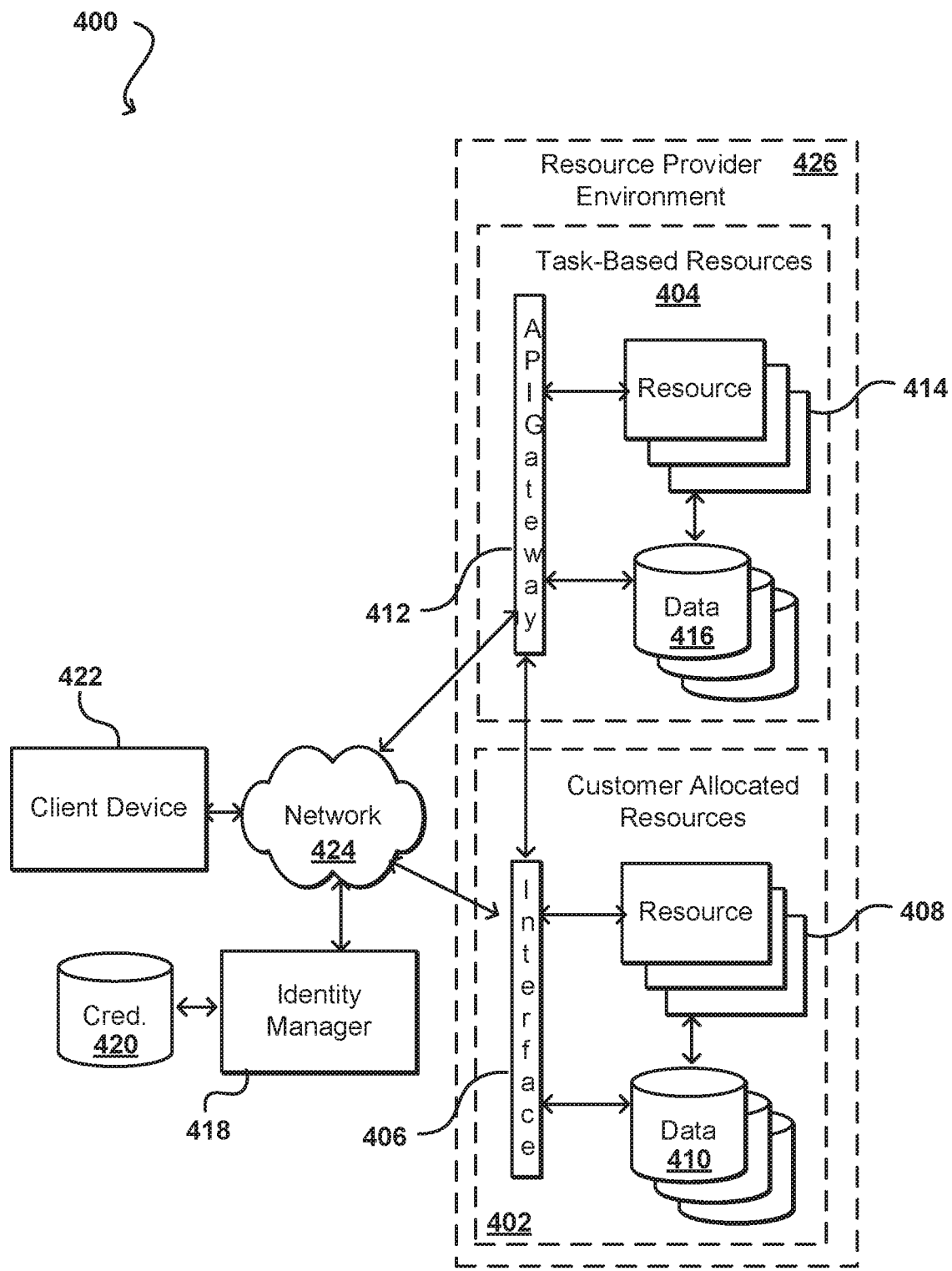
FIG. 4 illustrates an example architecture for allocating resources, in accordance with various embodiments of the present disclosure.

As mentioned, the resources in such an environment can be allocated for any of a number of different purposes for performing a variety of different tasks. As an example, one of the resources can be allocated under a customer account where the customer is an application developer or other such entity. The customer can provide access to the various resources to users (e.g., employees or contractors) under the credentials or identities for that account. As an example, FIG. 4 illustrates an example computing environment 400 wherein a client device 422 is able to submit requests over at least one network 424 to be received by an interface layer 406 of a resource provider environment 426. It should be understood that reference numbers may be carried over between figures for similar elements, for simplicity of explanation, but that such usage should not be interpreted as a limitation on the scope of the various embodiments unless otherwise specifically stated. In this example, the client device 422 is able to call into two different interface layers, although the interfaces could be part of a single layer or multiple layers in other embodiments. In this example, there can be a set of resources, both computing resources 408 and data resources 410, among others, allocated on behalf of the customer in a customer-allocated sub-environment 402 of the resource provider environment 426. These can be physical and/or virtual resources, but during the period of allocation the resources (or allocated portions of the resources) are only accessible using credentials associated with the customer account. These can include, for example, application servers and databases that are utilized over a period of time for various customer applications. The client device 422 can also make calls into an API gateway 412, or other such interface layer, of a task-based resource environment 404, or sub-environment. In such an environment, as is discussed in more detail later herein, portions of various resources 414 and data 416 can be allocated dynamically and on a task-specific basis. There can be resources allocated to perform a specific type of processing, and those resources can be allocated on an as-needed basis where the customer is only charged for the actual processing in response to a specific task. In various embodiments, an identity manager 418 can act as an authentication service for authenticating the client device to permit access of at least some of the resource provided in the resource provider environment 426. The identity manager 418 may access a credentials database 420 to perform authentication of credential provided by the client device.

Figure 5:
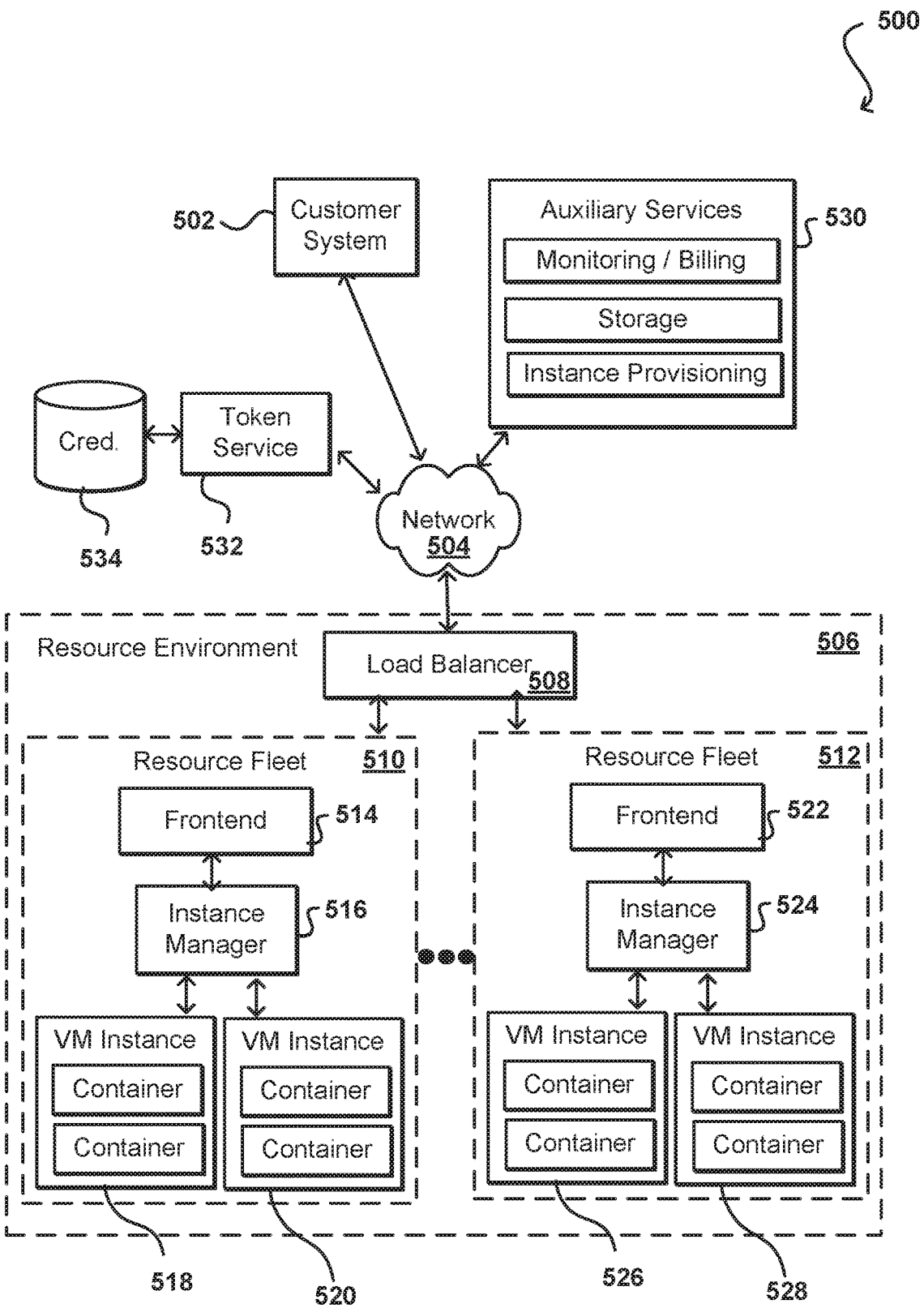
FIG. 5 illustrates an example service for allocating resources, in accordance with various embodiments of the present disclosure.

An environment such as that described with respect to FIG. 5 can facilitate the handling of requests to execute user code on a virtual compute fleet by utilizing the containers created on the virtual machine instances as compute capacity. Information for a request or event can be received to a load balancer 508 that can determine an appropriate resource fleet 510, 512 to which to direct the information. As will be discussed in more detail later herein, the decision can be based upon various types of information, as may include the context associated with the type of event or request. Upon receiving a request to execute user code on a selected virtual compute fleet 510, 512, a frontend service 514, 522 associated with the virtual compute fleet can provide the information to an instance manager, which can direct the information to a virtual machine (VM) instance 518, 520, 526, 528 where a container on the instance can provide an execution environment for the registered function.

The client device 502 may utilize one or more user interfaces, command-line interfaces (CLIs), application programming interfaces (APIs), and/or other programmatic interfaces for generating and uploading customer code, invoking the customer code (e.g., submitting a request to execute the code on the virtual compute system), scheduling event-based jobs or timed jobs, tracking the customer code, and/or viewing other logging or monitoring information related to their requests and/or customer code. Although one or more embodiments may be described herein as using a user interface, it should be appreciated that such embodiments may, additionally or alternatively, use any CLIs, APIs, or other programmatic interfaces.

In the example of FIG. 5, the resource environment 506 is illustrated as being connected to at least one network 504. In some embodiments, any of the components within the recourse environment can communicate with other components (e.g., client computing devices 502 and auxiliary services 530, which may include monitoring/logging/billing services, storage service, an instance provisioning service, and/or other services that may communicate with components or services of the resource environment 506. In other embodiments, only certain components such as the load balancer 508 and/or the frontends 514, 522 may be connected to the network 504, and other components of the virtual resource service (i.e., components of the resource fleets) may communicate with other components of the resource environment 506 via the load balancer 508 and/or the frontends 514, 522.

Customer may use the resource fleets 510, 512 to execute user code thereon. For example, a customer may wish to run a piece of code in connection with a web or mobile application that the customer has developed. One way of running the code would be to acquire virtual machine instances from service providers who provide infrastructure as a service, configure the virtual machine instances to suit the customer's needs, and use the configured virtual machine instances to run the code. Alternatively, the customer may send the resource service a code execution request. The resource service can handle the acquisition and configuration of compute capacity (e.g., containers, instances, etc., which are described in greater detail below) based on the code execution request, and execute the code using the compute capacity. The allocation may automatically scale up and down based on the volume, thereby relieving the customer from the burden of having to worry about over-utilization (e.g., acquiring too little computing resources and suffering performance issues) or under-utilization (e.g., acquiring more computing resources than necessary to run the codes, and thus overpaying).

In the configuration depicted in FIG. 5, a first resource fleet 510 includes a frontend 514, an instance manager 516 (later referred to herein as a worker manager), and virtual machine instances 518, 520. Similarly, other resource fleets 512 can also include a frontend 522, an instance manager 524, and virtual machine instances 526, 528, and there can be any appropriate number of resource fleets and any appropriate number of instances in each resource fleet. The environment can include low and high frequency fleets as well in at least some embodiments, as may serve different types of requests or requests for different types of customers. The fleets can also include any number of worker managers, and in some embodiments the frontend and the worker manager can be resident on a single virtual machine instance.

In some embodiments, the load balancer 508 serves as a front door to all the other services provided by the virtual compute system. The load balancer 508 processes requests to execute user code on the virtual compute system and handles the first level of load balancing across the frontends 514, 522. For example, the load balancer 508 may distribute the requests among the frontends 514, 522 (e.g., based on the individual capacity of the frontends). The requests can be distributed evenly across the frontends or distributed based on the available capacity on the respective fleets, among other such options.

Customer code as used herein may refer to any program code (e.g., a program, routine, subroutine, thread, etc.) written in a program language. Such customer code may be executed to achieve a specific task, for example, in connection with a particular web application or mobile application developed by the user. For example, the customer code may be written in JavaScript (node.js), Java, Python, and/or Ruby. The request may include the customer code (or the location thereof) and one or more arguments to be used for executing the customer code. For example, the customer may provide the customer code along with the request to execute the customer code. In another example, the request may identify a previously uploaded program code (e.g., using the API for uploading the code) by its name or its unique ID. In yet another example, the code may be included in the request as well as uploaded in a separate location (e.g., the external storage service or a storage system internal to the resource environment 506) prior to the request is received by the load balancer 508. The virtual compute system may vary its code execution strategy based on where the code is available at the time the request is processed.

In some embodiments, the frontend 514 for a fleet can determine that the requests are properly authorized. For example, the frontend 514 may determine whether the user associated with the request is authorized to access the customer code specified in the request. The frontend 514 may receive the request to execute such customer code in response to Hypertext Transfer Protocol Secure (HTTPS) requests from a customer, or user associated with that customer. Also, any information (e.g., headers and parameters) included in the HTTPS request may also be processed and utilized when executing the customer code. As discussed above, any other protocols, including, for example, HTTP, MQTT, and CoAP, may be used to transfer the message containing the code execution request to the frontend 514. The frontend 514 may also receive the request to execute such customer code when an event is detected, such as an event that the customer has registered to trigger automatic request generation. For example, the customer may have registered the customer code with an auxiliary service 530 and specified that whenever a particular event occurs (e.g., a new file is uploaded), the request to execute the customer code is sent to the frontend 514. Alternatively, the customer may have registered a timed job (e.g., execute the user code every 24 hours). In such an example, when the scheduled time arrives for the timed job, the request to execute the customer code may be sent to the frontend 514. In yet another example, the frontend 514 may have a queue of incoming code execution requests, and when the batch job for a customer is removed from the virtual compute system's work queue, the frontend 514 may process the customer request. In yet another example, the request may originate from another component within the resource environment 506 or other servers or services not illustrated in FIG. 5.

A customer request may specify one or more third-party libraries (including native libraries) to be used along with the customer code. In one embodiment, the customer request is a ZIP file containing the customer code and any libraries (and/or identifications of storage locations thereof) that are to be used in connection with executing the customer code. In some embodiments, the customer request includes metadata that indicates the program code to be executed, the language in which the program code is written, the customer associated with the request, and/or the computing resources (e.g., memory, etc.) to be reserved for executing the program code. For example, the program code may be provided with the request, previously uploaded by the customer, provided by the virtual compute system (e.g., standard routines), and/or provided by third parties. In some embodiments, such resource-level constraints (e.g., how much memory is to be allocated for executing a particular user code) are specified for the particular customer code, and may not vary over each execution of the customer code. In such cases, the virtual compute system may have access to such resource-level constraints before each individual request is received, and the individual requests may not specify such resource-level constraints. In some embodiments, the customer request may specify other constraints such as permission data that indicates what kind of permissions that the request has to execute the user code. Such permission data may be used by the virtual compute system to access private resources (e.g., on a private network).

In some embodiments, the customer request may specify the behavior that should be adopted for handling the customer request. In such embodiments, the customer request may include an indicator for enabling one or more execution modes in which the customer code associated with the customer request is to be executed. For example, the request may include a flag or a header for indicating whether the customer code should be executed in a debug mode in which the debugging and/or logging output that may be generated in connection with the execution of the customer code is provided back to the customer (e.g., via a console user interface). In such an example, the virtual compute system 110 may inspect the request and look for the flag or the header, and if it is present, the virtual compute system may modify the behavior (e.g., logging facilities) of the container in which the customer code is executed, and cause the output data to be provided back to the customer. In some embodiments, the behavior/mode indicators are added to the request by the user interface provided to the customer by the virtual compute system. Other features such as source code profiling, remote debugging, etc. may also be enabled or disabled based on the indication provided in the request.

The frontend 514 can receive requests to execute customer code on the virtual compute system that have been processed by the load balancer 508. The frontend 514 can request the instance manager 516 associated with the frontend 514 of the particular fleet 510 to find compute capacity in one of the virtual machine instances 518, 520 managed by the instance manager 516. The frontend 514 may include a usage data manager for determining the usage status (e.g., indicating how frequently the user code is executed) of a particular customer code, and a customer code execution manager for facilitating the execution of customer code on one of the virtual machine instances managed by the worker manager. The instance manager 516 manages the virtual machine instances in the respective fleet. After a request has been successfully processed by the load balancer 508 and the frontend 514, the instance manager 516 finds capacity to service the request to execute customer code on the virtual compute system. For example, if a container exists on a particular virtual machine instance that has the user code loaded thereon, the instance manager 516 may assign the container to the request and cause the request to be executed in the container. Alternatively, if the customer code is available in the local cache of one of the virtual machine instances, the instance manager 516 may create a new container on such an instance, assign the container to the request, and cause the customer code to be loaded and executed in the container. Otherwise, the instance manager 516 may assign a new virtual machine instance to the customer associated with the request from the pool of pre-initialized and pre-configured virtual machine instances, download the customer code onto a container created on the virtual machine instance, and cause the customer code to be executed in the container.

In some embodiments, the virtual compute system is adapted to begin execution of the customer code shortly after it is received (e.g., by the load balancer 508 or frontend 514). A time period can be determined as the difference in time between initiating execution of the customer code (e.g., in a container on a virtual machine instance associated with the customer) and receiving a request to execute the customer code (e.g., received by a frontend). The virtual compute system can be adapted to begin execution of the customer code within a time period that is less than a predetermined duration. The customer code may be downloaded from an auxiliary service 530. The data may comprise user code uploaded by one or more customers, metadata associated with such customer code, or any other data utilized by the virtual compute system to perform one or more techniques described herein. Although only the storage service is illustrated in the example of FIG. 5, the resource environment 506 may include other levels of storage systems from which the customer code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system) associated with the instance on which the container is created. Alternatively, the code may be downloaded from a web-based data store provided by the storage service.

In some embodiments, once a virtual machine instance has been assigned to a particular customer, the same virtual machine instance cannot be used to service requests of any other customer. This provides security benefits to customers by preventing possible co-mingling of user resources. Alternatively, in some embodiments, multiple containers belonging to different customers (or assigned to requests associated with different customers) may co-exist on a single virtual machine instance. Such an approach may improve utilization of the available compute capacity. Although the virtual machine instances are described here as being assigned to a particular customer, in some embodiments the instances may be assigned to a group of customers, such that an instance is tied to the group of customers and any member of the group can utilize resources on the instance. For example, the customers in the same group may belong to the same security group (e.g., based on their security credentials) such that executing one member's code in a container on a particular instance after another member's code has been executed in another container on the same instance does not pose security risks. Similarly, the instance manager 516 may assign the instances and the containers according to one or more policies that dictate which requests can be executed in which containers and which instances can be assigned to which customers. An example policy may specify that instances are assigned to collections of customers who share the same account (e.g., account for accessing the services provided by the virtual compute system). In some embodiments, the requests associated with the same customer group may share the same containers (e.g., if the customer code associated therewith are identical). In some embodiments, a request does not differentiate between the different customers of the group and simply indicates the group to which the customers associated with the requests belong. In some embodiments, the virtual compute system may maintain a separate cache in which customer code is stored to serve as an intermediate level of caching system between the local cache of the virtual machine instances and a web-based network storage (e.g., accessible via the network 504).

The instance manager 516 may also manage creation, preparation, and configuration of containers within virtual machine instances. Containers can be logical units within a virtual machine instance and utilize resources of the virtual machine instances to execute customer code. Based on configuration information associated with a request to execute customer code, such a container manager can create containers inside a virtual machine instance. In one embodiment, such containers are implemented as Linux containers.

After the customer code has been executed, the instance manager 516 may tear down the container used to execute the user code to free up the resources it occupied to be used for other containers in the instance. Alternatively, the instance manager 516 may keep the container running to use it to service additional requests from the same customer. For example, if another request associated with the same customer code that has already been loaded in the container, the request can be assigned to the same container, thereby eliminating the delay associated with creating a new container and loading the customer code in the container. In some embodiments, the instance manager 516 may tear down the instance in which the container used to execute the customer code was created. Alternatively, the instance manager 516 may keep the instance running to use the instance to service additional requests from the same customer. The determination of whether to keep the container and/or the instance running after the user code is done executing may be based on a threshold time, the type of the user, average request volume of the user, and/or other operating conditions.

In some embodiments, the virtual compute system may provide data to one or more of the auxiliary services 530 as the system services incoming code execution requests. For example, the virtual compute system may communicate with the monitoring/logging/billing services, which may include: a monitoring service for managing monitoring information received from the virtual compute system, such as statuses of containers and instances on the virtual compute system; a logging service for managing logging information received from the virtual compute system, such as activities performed by containers and instances on the virtual compute system; and a billing service for generating billing information associated with executing customer code on the virtual compute system (e.g., based on the monitoring information and/or the logging information managed by the monitoring service and the logging service). In addition to the system-level activities that may be performed by the monitoring/logging/billing services (e.g., on behalf of the virtual compute system) as described above, the monitoring/logging/billing services may provide application-level services on behalf of the customer code executed on the virtual compute system. For example, the monitoring/logging/billing services may monitor and/or log various inputs, outputs, or other data and parameters on behalf of the customer code being executed on the virtual compute system. Although shown as a single block, the monitoring, logging, and billing services may be provided as separate services.

In some embodiments, the instance manager 516 may perform health checks on the instances and containers managed by the instance manager (e.g., an "active pool" of virtual machine instances managed by the instance manager and currently assigned to one or more customers). For example, the health checks performed by the instance manager 516 may include determining whether the instances and the containers managed by the instance manager have any issues of (1) misconfigured networking and/or startup configuration, (2) exhausted memory, (3) corrupted file system, (4) incompatible kernel, and/or any other problems that may impair the performance of the instances and the containers. In one embodiment, the instance manager 516 performs the health checks periodically. In some embodiments, the frequency of the health checks may be adjusted automatically based on the result of the health checks. In other embodiments, the frequency of the health checks may be adjusted based on customer requests. In some embodiments, the instance manager 516 may perform similar health checks on the instances and/or containers in the pool of pre-warmed virtual machine instances that are not yet assigned to any customer but ready to service incoming requests. The instances and/or the containers in such a warming pool may be managed either together with those instances and containers in the active pool or separately. In some embodiments, in the case where the health of the instances and/or the containers in the warming pool is managed separately from the active pool, a separate warming pool manager that manages the warming pool may perform the health checks described above on the instances and/or the containers in the warming pool.

The virtual machine instances can be logical in nature and implemented by a single or multiple physical computing devices. At least some of the virtual machine instances may be provisioned to provide a variety of different desired conditions depending on the needs of the user. Examples of the types of desired conditions include, but are not limited to: particular operating systems, particular language runtimes, and particular libraries that may be utilized by the user code. Additionally, one or more virtual machine instances may be provisioned generically when a desired operating condition is not specified or is otherwise not available. One skilled in the relevant art will appreciate that the virtual compute system is logical in nature and can encompass physical computing devices from various geographic regions.

The frontend 514, 522 can route code-processing requests according to a method that is different than the method used by the load balancer 508 to route requests among the frontends. For example, a frontend 514 can route the requests to the specific instance manager based on the customer code and/or based on the customer associated with the customer code. In some embodiments, the routing is determined based on a consistent-hashing scheme in which one or more parameters associated with the request (e.g., customer ID, customer code ID, etc.) are hashed according to a hash function and the request is sent to one of the instance managers that has previously been assigned to the sections of a hash ring (e.g., containing a plurality of hash values) that corresponds to the resulting hash value. For example, the instance managers can occupy one or more sections of the hash ring, and the requests can be mapped to those same hash values. In some embodiments, the hash values may be integer values, and each instance manager may be associated with one or more integer values. The one or more integer values associated with a particular instance manager may be determined based on one or more parameters associated with the instance manager (e.g., IP address, instance ID, etc.). In some embodiments, the request may be sent to the instance manager whose associated integer values are closest to, but not larger than, the hash value calculated for that request (e.g., using modulo arithmetic).

When the frontends determine that one or more instance managers have become unavailable, the frontends can associate the hash values previously associated with the one or more instance managers that have become unavailable with one or more available instance managers in another fleet. Similarly, when a new instance manager is added to a fleet, the new instance manager may take a share of the hash values associated with the existing instance managers. For example, the new instance manager may be assigned one or more sections of the hash ring that were previously assigned to the existing instance managers.

As mentioned, resource capacity can be allocated as needed to execute code or perform specific tasks, which can be allocated in response to various events. The events can include any appropriate types of events, as may be permitted by a service provider or allowed through various rules or policies, among other such options. These can include, for example, modifications to data buckets or updates to data tables, among other such options. The dynamic allocation of such capacity enables service owners to get out of the business of provisioning and managing the underlying hardware for executing code. For flexibility and efficiency in resource management, such a platform or service might not make any guarantees with respect to reusing the same containers or resource instances for running a specific instance of code, such as a registered function, for all incoming requests.

As mentioned, in order to process various types of events a resource instance for a registered function may require access to various other resources, data sources, or other relevant systems or functionality in (or outside) a resource allocation environment. In some embodiments, a function can be configured with a specified identity, which will have various associated permissions and privileges. A registered function can be associated with a determined identity, and when a resource instance is allocated for the registered function, the resource instance can be provided with an access token, or other appropriate security credential, which can provide the access needed for that function. As illustrated in the example 500 of FIG. 5, the token can be provided by a token service 532, which can be internal or external to the resource environment 506, and may managed by the resource provider or a third party in various embodiments. The token service can store information about various types of identities and access in a credential repository 534, or other appropriate location, and in response to a request for an access token for a registered function, can determine the appropriate identity and permissions and provide a corresponding access token to be provided to the allocated resource instance. The frontend 514 or instance manager 516 for a relevant resource fleet 510 can cause the configured identity to be bound to the relevant host(s) when an instance of a registered function is created on that host. The identity can be bound as an instance profile or other such mechanism. Once the identity is bound, the resource instance can assume the bound identity for accessing various resources or dependencies, as may include various data sources, internal or external resource, or network functionality, among other such options. The resource instance can thus obtain the temporary credentials needed to execute the registered function and process the event.

Figure 6:
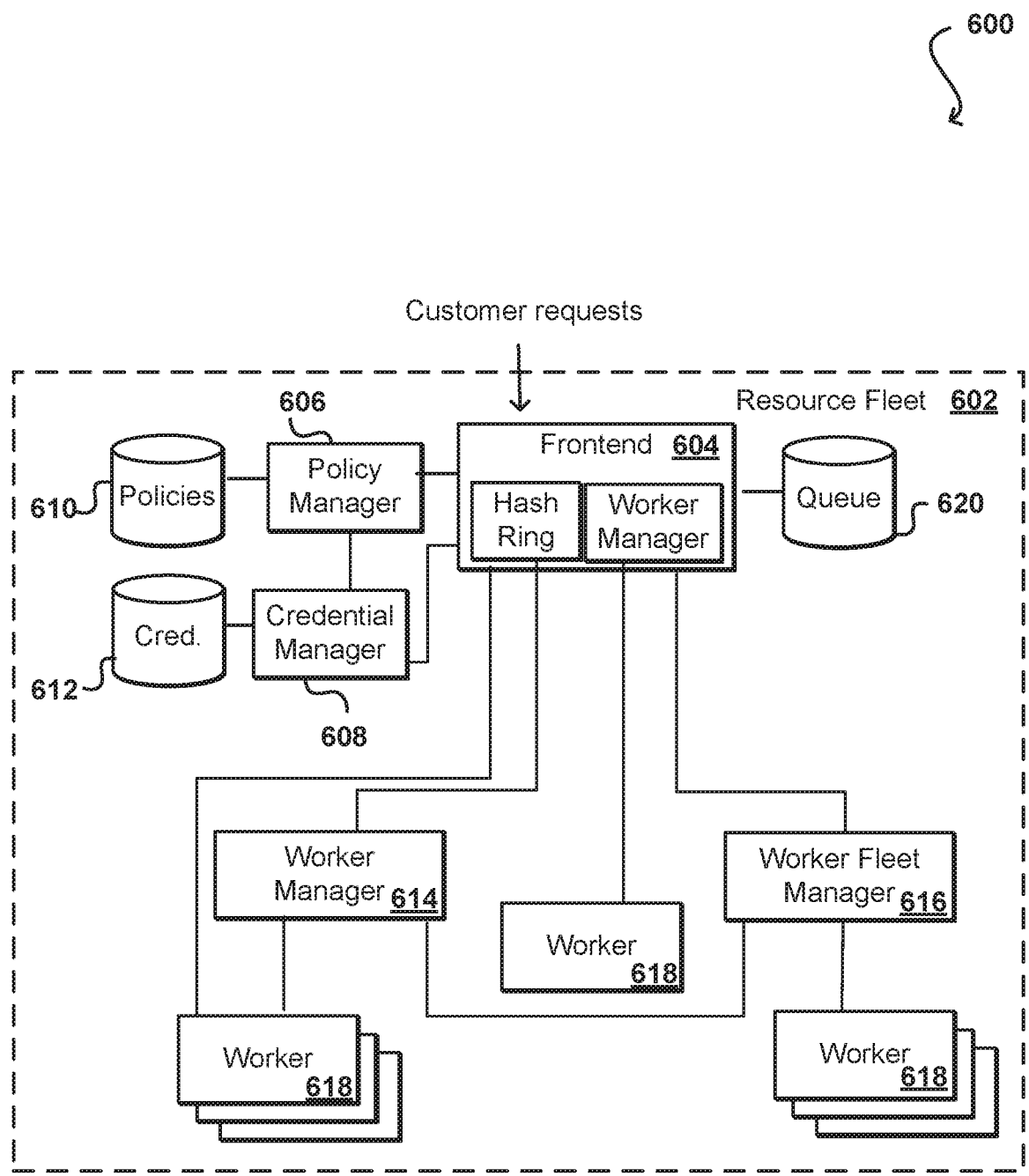
FIG. 6 illustrates an example service for allocating task-based resources, in accordance with various embodiments of the present disclosure.

FIG. 6 illustrates an example environment 600 that can be used to implement at least some of this functionality. In this example, information for customer requests or events can be directed to a resource fleet 602. The information can be directed using a load balancer and/or interface layer as discussed previously as part of a resource allocation environment. In this example the resource instances will be referred to as "workers," which in various embodiments can refer to the virtual machine instances 518, 520, 526, 528 described with respect to FIG. 5. It should be understood, however, that various other types of resource instances can be utilized as workers as well within the scope of the various embodiments. The resource fleet 602 may include a policy manager 606, a credential manager 608, and a policies database 610 and a credential database 612 for applying authenticating customer requests and applying the appropriate policies.

As described, the frontend 604 may receive an event notification, customer request, or other event information that indicates an event has occurred for which a registered function should be utilized or processing. In this example, the frontend 604 can determine the appropriate registered function and place the event information in an event queue 620. In other embodiments the event information might be placed into the event queue before determining the registered function, or the event information might specify the registered function, among other such options. Further, in this event the frontend 604 and/or a worker manager of the frontend can place the event information in the event queue 620, while in other embodiments other worker managers 614, 616 might receive the information and place the information in the same, or a different queue, among other such options. The frontend, worker manager, or a separate queue manager can determine that a worker 618 is now available to process the event information using the respective registered function. This can include, for example, determining that a new instance should be initialized to process the event as well as allocating an existing instance, etc. The respective worker manager 614 can then allocate the relevant worker 618 for the event, pull the event information from the event queue 620, and provide the information to the allocated worker 618 for processing using the registered function.

At some subsequent point, the allocated worker 614 will complete processing for the event. This can occur for a number of different reasons as discussed elsewhere herein. The allocated instance can return a result of the processing that can be received back to the worker manager 614 and/or the frontend 604. In some embodiments the result will go to the worker manager, so the manager knows the instance is available for processing another event, and then can go to the frontend, so the frontend can provide any appropriate response or take another appropriate action.

In order to process the event, a worker 618 will have to be allocated for the relevant registered function. As mentioned, the worker will need to obtain the appropriate access credential(s) for the registered function, as may be determined by an identity bound to that instance for the registered function. As mentioned, the identity can provide various types of access for a determined period of time, such as fifteen minutes in some embodiments, although other lengths of time can be specified as well. Since there can be various types of triggering events for a function, the identity can enable access to all relevant data for any of those events for the entire lifecycle of the function. As mentioned, however, granting all the access provided under the identity can enable any vulnerability in the registered function to access data outside the scope of the registered function, and potentially exfiltrate the credentials outside of the function for various other purposes. As an example, various parsers might be used to ingest and process different types of documents, and without a security review of those parsers there is potential that parsing of an untrusted document could expose access to the function credentials.

Figure 7:
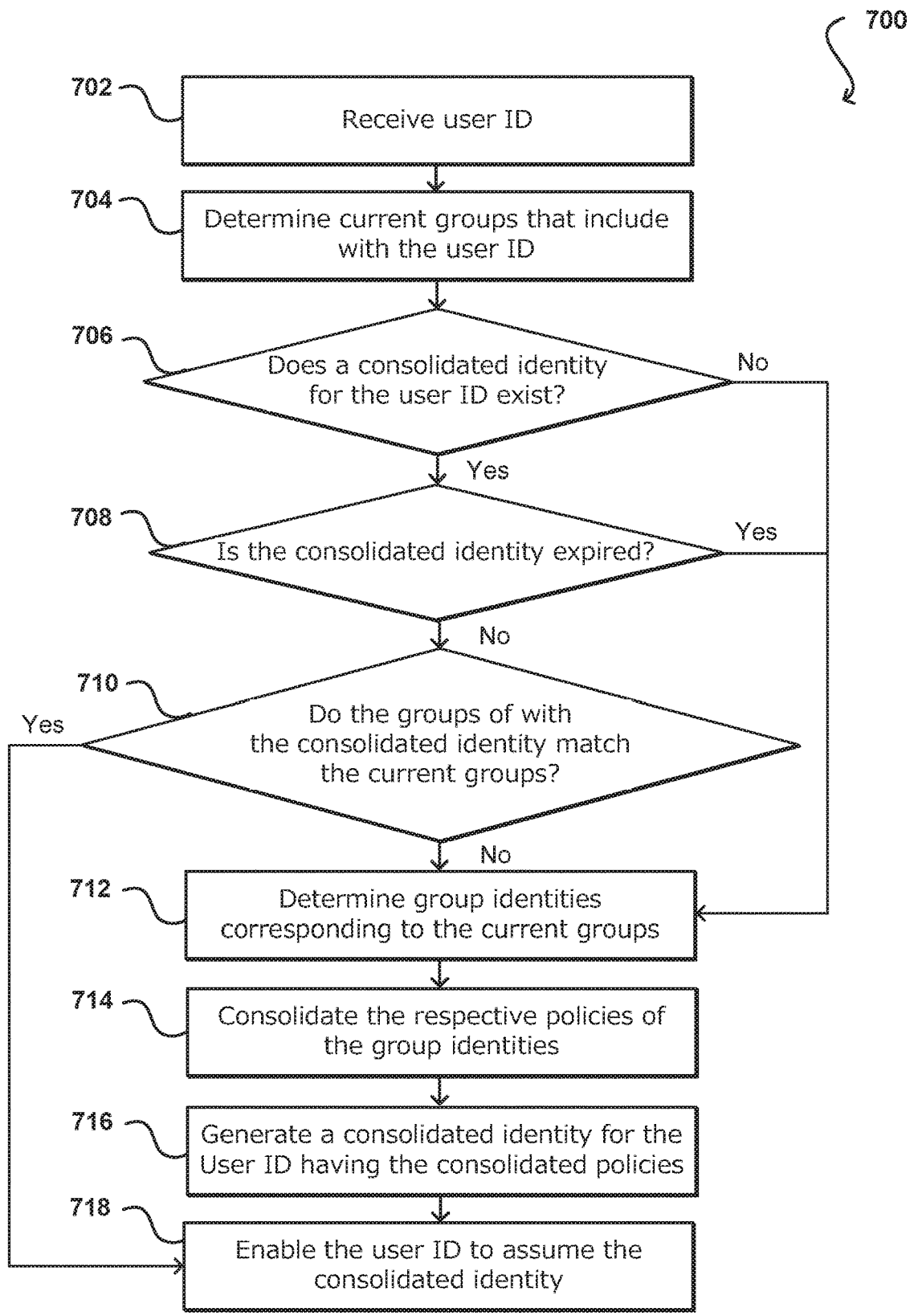
FIG. 7 illustrates an example process for providing a user with a role having consolidated policies, in accordance with various embodiments of the present disclosure.

FIG. 7 illustrates an example process 700 for providing a user with an identity having consolidated policies, in accordance with various embodiments. It should be understood that, for any process discussed herein, there can be additional, fewer, or alternative steps performed in similar or alternative orders, or in parallel, within the scope of the various embodiments. In this example, a user ID is received 702, such as attached to a request to access a resource provider environment. The user ID may be used to determine 704 current groups in a client directory (e.g., active directory) to which the user ID belongs. It can then be determined 706 whether a consolidated identity exists for the user ID. A consolidated identity may refer to a previously generated identity that includes the consolidated policies of separate identities associated with the user ID. In some embodiments, an audit table may be queried to make the determination. If a consolidated identity does exist for the user ID, it is then checked 708 whether or not the consolidated identity is expired. In some embodiments, the consolidated identity has an expiry date or other parameter. If the consolidated identity has not expired, it is then checked whether the groups associated with the consolidated identity match the current groups determined at step 704. In some embodiments, the groups associated with the consolidated identity are the groups that the user ID belonged to at the time the consolidated role was generated. In various embodiments, if the groups associated with the consolidated identity are not the same set of groups as the current groups 704, then a new consolidated identity is to be generated for the user ID. Steps 706, 708, and 710 each represent a condition for a valid identity. Thus, if the each of the three conditions is met, including the existence of a consolidated identity that is not expired, and whose groups match the current groups of the user ID, then the user ID is enabled 718 to assume the valid consolidated identity. However, if any of the conditions 706, 708, 710 are not satisfied, a new consolidated identity is to be generated (steps 712-716) for the user ID. Specifically, to generate a new consolidated identity, group identities corresponding to the current groups are determined 712. Group identities are mapped to the current groups at a one-to-one basis, such that one group corresponds to exactly one group identity. Each group identity also includes a distinct policy that determined what resources can be accessed by said identity. When the group identities are determined, the respective policies of the group identities are consolidated 714. A new consolidated identity is generated 716 and assigned the consolidated policies of all the group identities. Thus, the new consolidated identity has access to all of the resources that may be accessed by any of the group identities. The user ID is then enabled 718 to assume the consolidated identity. FIG. 7 illustrates examples of various validity conditions that can be utilized to check if a valid consolidated identity exists for the user ID.

Figure 8:
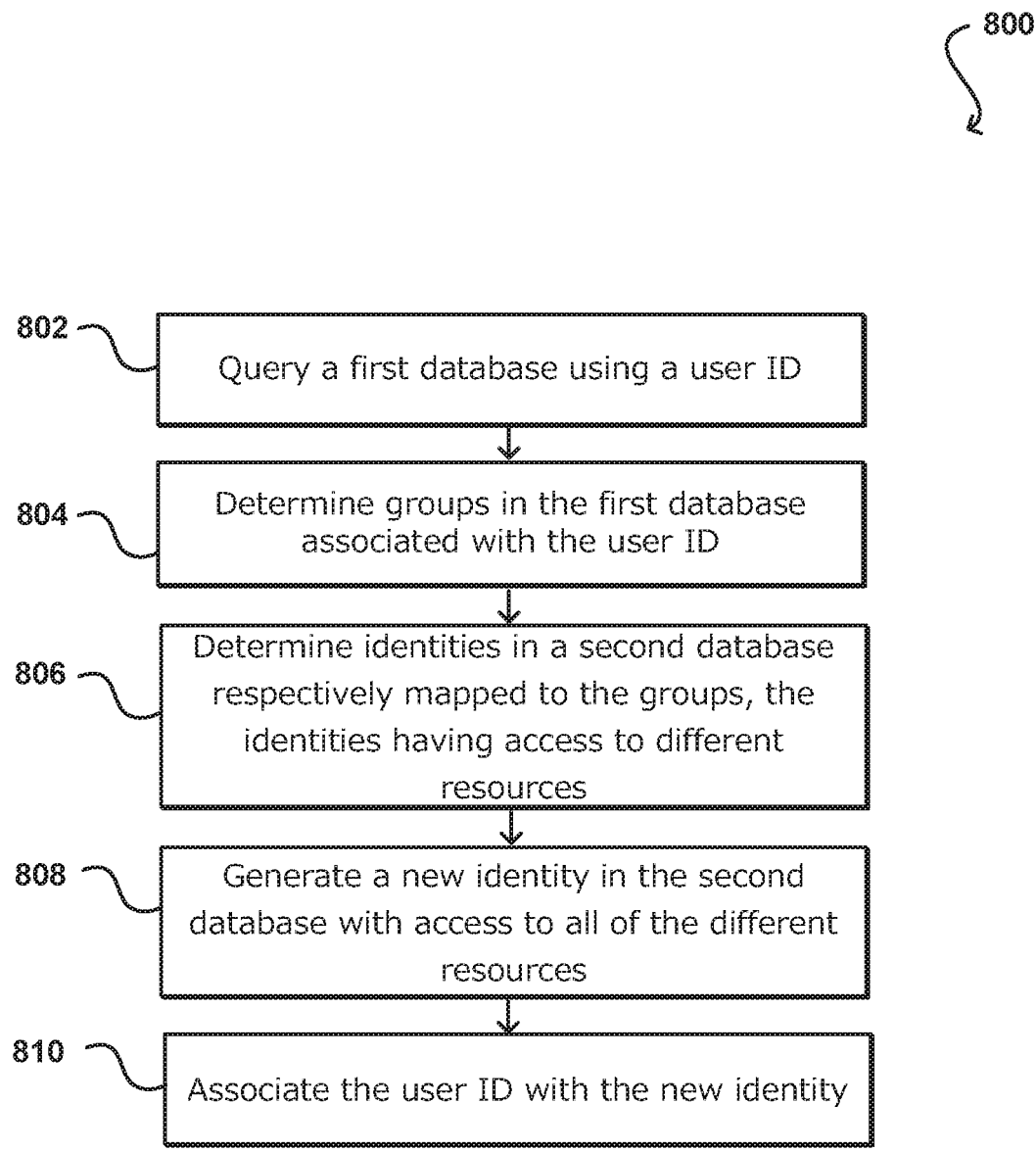
FIG. 8 illustrates an example process for generating a role with consolidated policies of other roles, in accordance with various embodiments of the present disclosure.

FIG. 8 illustrates an example process 800 for generating an identity with consolidated policies of other identities, in accordance with various embodiments. In this example, a first database is queried 802 using a user identifier. The first database may include an active directory associated with a customer of a resource provider. The first database may include a plurality of groups into which a plurality of users are assigned, define various access levels or actions that can be taken by users in particular groups. Thus, the groups with which this particular user identifier is associated can be determined 804. The groups may be mapped to identities in a second database on a one-to-one basis. The different identities may have different policies that dictate which resources are accessible through each of the different identities, so users belonging to different groups may have access to difference resources within the resource provider environment. In some embodiments, the mapping between groups and identities in the resource provider environment may be maintained by a resource manager or database in the resource provider environment. Thus, the identities in the resource provider environment that are respectively mapped to the user's groups can be determined 806. The second database may be a part of a resource provider environment. Each of the identities may have access of different resources, some of which may overlap.

A new identity is generated 808 in the second database that has access to all of the different resource of the mapped identities. In some embodiments, the access to all of the different resources may be defined through one or more permissions or policies assigned to the new identity. For example, the mapped identities each have respective policies that define access of one or more resources. Thus, the new identity may include a policy or policies that consolidate the policies of all of the mapped identities associated with the user identifier. In some embodiments, the policy of an identity may be made up of one or more data objects. The consolidation of the policies of the plurality of identities may include creating a policy that includes all the data objects that make up the policies of all the identities. Consolidation of the policies may also include generating a new policy (e.g., one or more data objects) based on the content of the policies of all the identities. In some embodiments, the policies of the plurality of identities may include redundant data, such as redundant permissions. In such cases, copies of redundant data may be deleted.

The user identifier is then associated 810 with the new identity, and requests associated with the user identifier may access all of the different resources. Specifically, calls and requests associated with the user ID may be able to access the resources. The dynamically generated new identity may be a provisional identity that has a certain valid duration, among other conditions of validity. In various embodiments, the new identity may be recorded as an entry in a database, such as an audit table, which includes various metadata of the identity, such as a user ID, an identity ID, a create date, an expiry date, AD groups, and policies.

Figure 9:
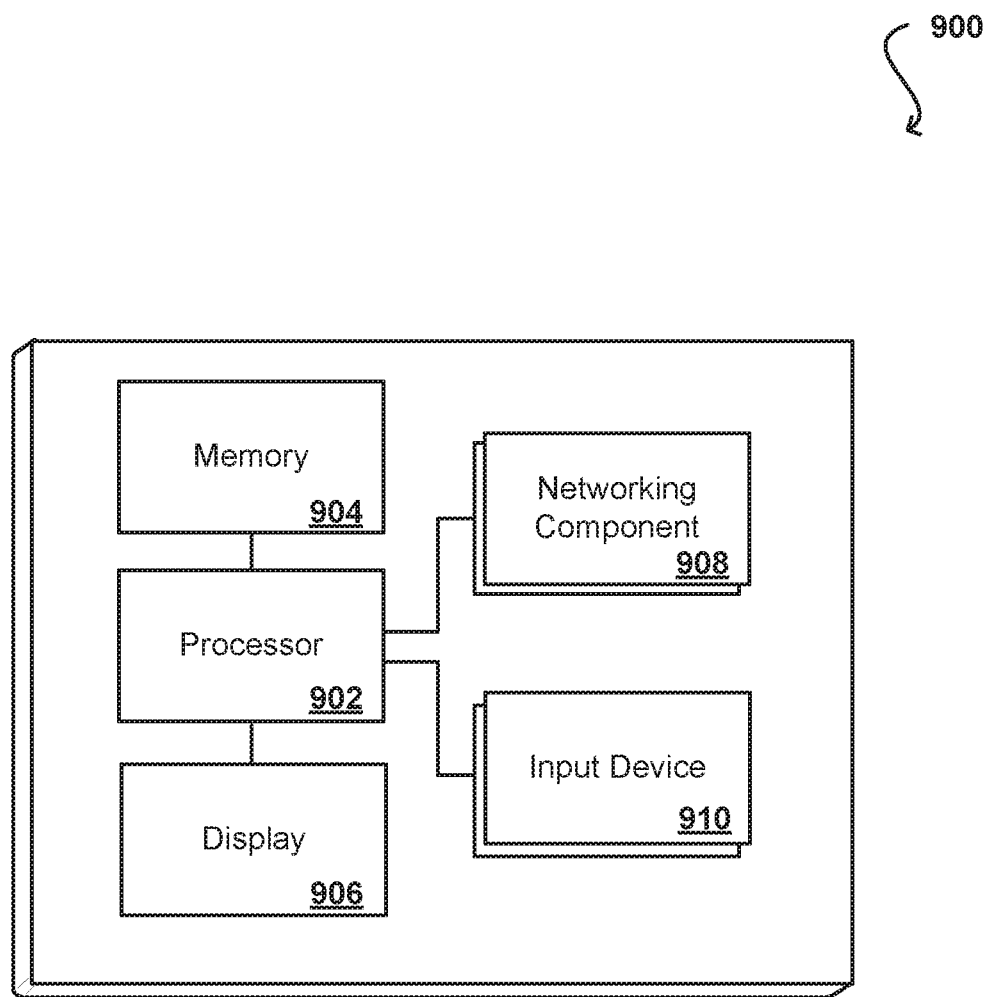
FIG. 9 illustrates example components of a computing device that can be used, in accordance with various embodiments of the present disclosure.

FIG. 9 illustrates a set of basic components of an example computing device 900 that can be utilized to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device may include at least one type of display element 906, such as a touch screen, electronic ink (e-ink), organic light emitting diode (OLED) or liquid crystal display (LCD), although devices such as servers might convey information via other means, such as through a system of lights and data transmissions. The device typically will include one or more networking components 908, such as a port, network interface card, or wireless transceiver that enables communication over at least one network. The device can include at least one input device 910 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a user login comprising a user identifier;
determining that the user identifier is not associated with a valid identity in a host database;
querying a client directory using the user identifier;
determining one or more groups in the client directory to which the user identifier belongs, wherein individual groups in the client directory are mapped to individual identities in the host database;
determining one or more identities in the host database respectively mapped to the one or more groups, the one or more groups in the client directory mapped to the one or more identities in the host database on a one-to-one basis, the host database being a part of a resource provider environment and the first client directory external to the resource provider environment, the one or more identities respectively associated with one or more policies in the resource provider environment;
generating a provisional identity in the host database, the provisional identity providing access to resources based on policies assigned thereto;
assigning the one or more policies to the provisional identity, the one or more policies defining access to one or more resources in the resource provider environment;
associating the user identifier with the provisional identity in the host database; and
enabling requests using the user identifier to access the one or more resources.

2. The method of claim 1, further comprising:
receiving a subsequent user login comprising the user identifier;
determining that the user identifier is associated with the provisional identity;
determining that the provisional identity is valid; and
enabling subsequent requests using the user identifier to access the one or more resources.

3. The method of claim 2, further comprising:
querying the client directory using the user identifier;
determining one or more current groups in the client directory to which the user identifier belongs;

querying an audit table using the user identifier, the audit table including a record of the provisional identity, the record including the user identifier, an identity identifier, an expiration parameter, the one or more groups, and the one or more policies;
determining, based on the expiration parameter, that the provisional identity has not expired; and
determining that the one or more groups in the record match the one or more current groups in the client directory.

4. A computer-implemented method, comprising:
querying a first database using a user identifier;
determining one or more groups in the first database associated with the user identifier;
determining one or more identities in a second database respectively associated with the one or more groups, the one or more groups in the first database mapped to the one or more identities in the second database on a one-to-one basis, the second database being a part of a resource provider environment and the first database external to the resource provider environment, the one or more identities providing respective access to one or more resources in the resource provider environment;
generating an identity in the second database with access to all of the one or more resources; and
associating the user identifier with the generated identity.

5. The method of claim 4, further comprising:
creating a record of the generated identity in a third database, the record including the user identifier, an identity identifier, an expiration parameter, the one or more groups, and one or more policies defining access to the one or more resources.

6. The method of claim 4, further comprising:
querying a third database using the user identifier, the third database including records of previously generated identities; and
determining, from the third database, that a valid identity does not exist for the user identifier.

7. The method of claim 6, further comprising:
determining, from the third database, a record of an identity for the user identifier;
determining that the identity is no longer valid; and
deleting the identity from the second database and maintaining the record of the identity in the third database.

8. The method of claim 6, further comprising:
determining, from the third database, a record of an identity for the user identifier, the record indicating that the identity has expired; and
determining that the identity is no longer valid.

9. The method of claim 6, further comprising:
determining, from the third database, a record of an identity for the user identifier, the record including a one or more groups previously associated with the identity, wherein the one or more group in the record are not the same set of groups as the one or more groups in the first database; and
determining that the identity is no longer valid.

10. The method of claim 4, wherein the second database is hosted in a resource provider environment, wherein the first database includes an active directory hosted in a client environment or a third-party identity provider environment, and wherein the one or more groups includes one or more active directory groups.

11. The method of claim 10, further comprising:
receiving a user login associated with active directory credentials, the user login including the user identifier.

12. The method of claim 4, further comprising:
enabling a request using the user identifier to access any of the one or more resources.

13. The method of claim 4, wherein the one or more resources include data or services hosted by a resource provider environment.

14. A system, comprising:
at least one computing device processor; and
a memory device including instructions that, when executed by the at least one computing device processor, cause the system to:
query a first database using a user identifier;
determine one or more groups in the first database associated with the user identifier;
determine one or more identities in a second database respectively associated with the one or more groups, the one or more groups in the first database mapped to the one or more identities in the second database on a one-to-one basis, the second database being a part of a resource provider environment and the first database external to the resource provider environment, the one or more identities providing respective access to one or more resources in the resource provider environment;
generate an identity in the second database with access to all of the one or more resources; and
associate the user identifier with the generated identity.

15. The system of claim 14, wherein the instructions when executed further cause the system to:
create a record of the generated identity in a third database, the record including the user identifier, an identity identifier, an expiration parameter, the one or more groups, and one or more policies defining access to the one or more resources.

16. The system of claim 14, wherein the instructions when executed further cause the system to:
query a third database using the user identifier, the third database including records of previously generated identities; and
determine, from the third database, that a valid identity does not exist for the user identifier.

17. The system of claim 16, wherein the instructions when executed further cause the system to:
determine, from the third database, a record of an identity for the user identifier;
determine that the identity is no longer valid; and
delete the identity from the second database and maintaining the record of the identity in the third database.

18. The system of claim 16, wherein the instructions when executed further cause the system to:
determine, from the third database, a record of an identity for the user identifier, the record indicating that the identity has expired; and
determine that the identity is no longer valid.

19. The system of claim 16, wherein the instructions when executed further cause the system to:
determine, from the third database, a record of an identity for the user identifier, the record including a one or more groups previously associated with the identity, wherein the one or more group in the record are not the same set of groups as the one or more groups in the first database; and
determine that the identity is no longer valid.

20. The system of claim 14, wherein the second database is hosted in a resource provider environment, wherein the first database includes an active directory hosted in a client environment or a third-party identity provider environment, and wherein the one or more groups includes one or more active directory groups.

* * * * *